Figure 4:
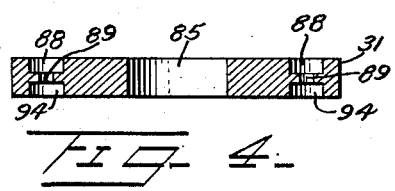

Dec. 12, 1950  F. A. LASSERRE  2,533,673
JUNCTION BOX ASSEMBLY
Filed June 17, 1946  3 Sheets-Sheet 1
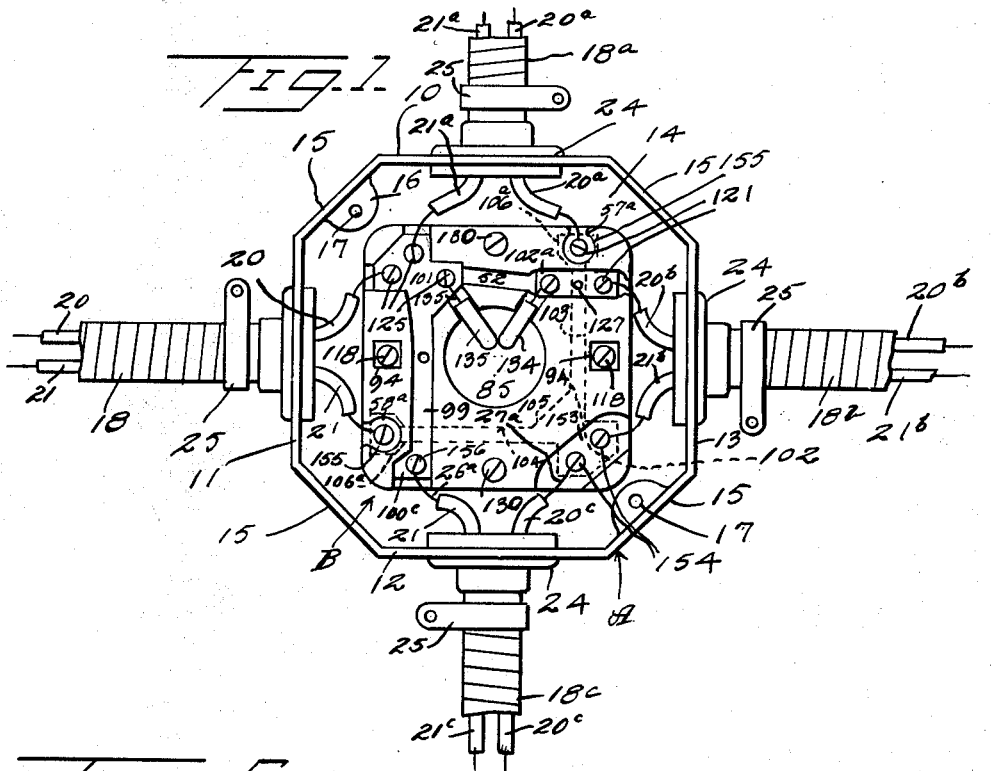
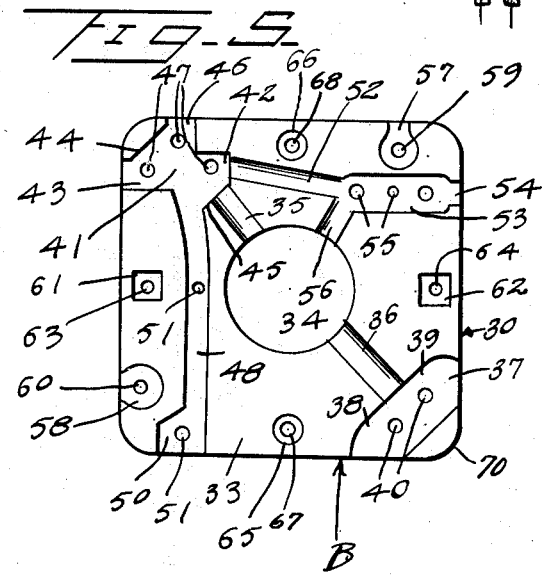
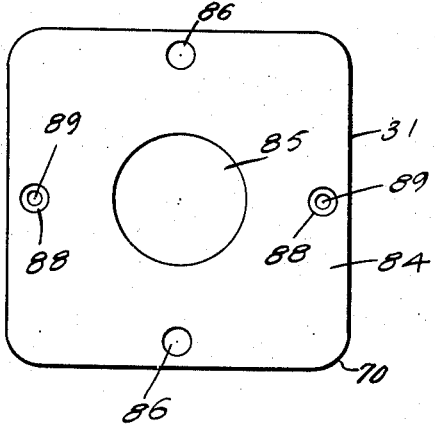
Inventor
F. A. Lasserre
By Kimmel & Crowell Attorneys Dec. 12, 1950   F. A. LASSERRE   2,533,673
JUNCTION BOX ASSEMBLY Filed June 17, 1946   3 Sheets-Sheet 2

Inventor
F. A. Lasserre
By Kimmel & Crowell Attorneys

Dec. 12, 1950  F. A. LASSERRE  2,533,673
JUNCTION BOX ASSEMBLY
Filed June 17, 1946  3 Sheets-Sheet 3
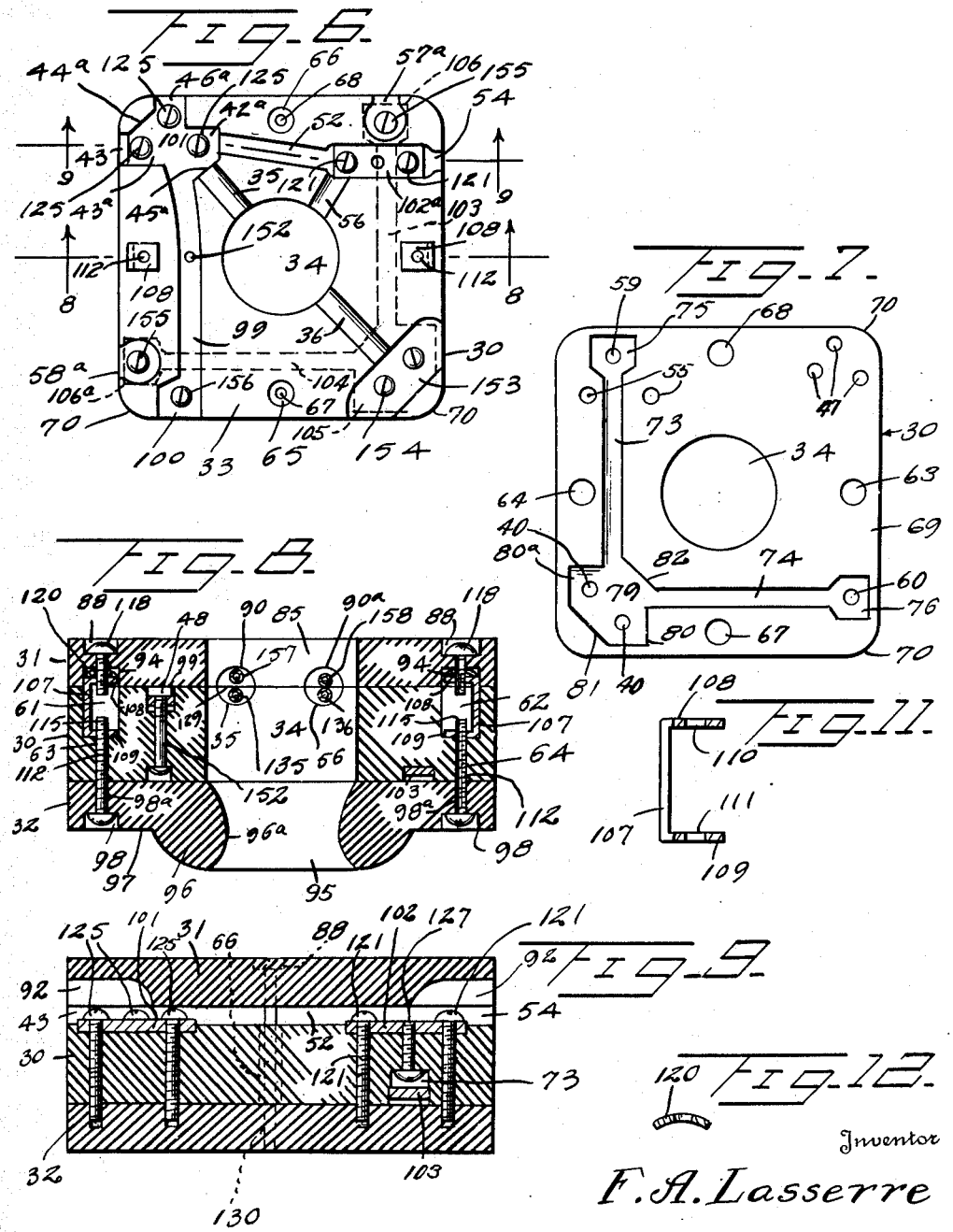
Inventor
F. A. Lasserre
By Kimmel & Crowell Attorneys Patented Dec. 12, 1950

2,533,673

UNITED STATES PATENT OFFICE 2,533,673

JUNCTION BOX ASSEMBLY

Francois A. Lasserre, Rayne, La.

Application June 17, 1946, Serial No. 677,155

3 Claims. (Cl. 174—59)

The present invention relates to improvements in junction or outlet boxes for BX or Greenfield cables.

One of the objects thereof is to provide a simple, efficient and inexpensive junction box in which is mounted an insulating current distributing block so shaped, arranged and cooperating with the junction or outlet box that a diversity of circuit lines may connect therewith which was not found practicable to accomplish before in a junction box.

Another object thereof is to provide a six-way lead wire connection to a junction box, made possible by employing the electrical means comprising my invention. For this purpose I provide an insulating current distributing sectional block in the outlet or junction box constructed with the view of allowing connection from the four sides of the box of four cables, and further permitting two more cables to extend centrally of the block running in opposite directions vertically or horizontally.

Another object thereof is to provide, in a device of the kind described, improved means for constructing the insulating current distributing block so that all of its circuit making contacts are effectively imbedded therein.

Another object thereof is to provide, in a device of the kind described, improved means for permitting connection of six different BX cables or similar wire connections to enter the box from the sides and center and all be laid over the same side of the insulating block bound under the binding screws to which they are attached, to thereby produce all open wire work in the assembly of electrical parts in the box.

A still further object is to provide, in a device of the kind described, improved means for keeping separately insulated but included in one and the same electrical circuit, the attaching terminals of at least six different cables, all contacts being imbedded in a single insulating current distributing block in such a manner that while some contacts are on one side of the block, and other contacts are located on an opposite side thereof, and while some contacts have extensions intersecting the planes of other contacts, all contact members have terminals located on one and the same side of the block to which the wires of the cables are directly connected in a manner approved by accepted standards outlined for such electrical work.

With the above and other objects in view, my invention consists in the combination, arrangement and details of construction disclosed in the drawings and specifications and then more particularly pointed out in the appended claims.

Figure 3:
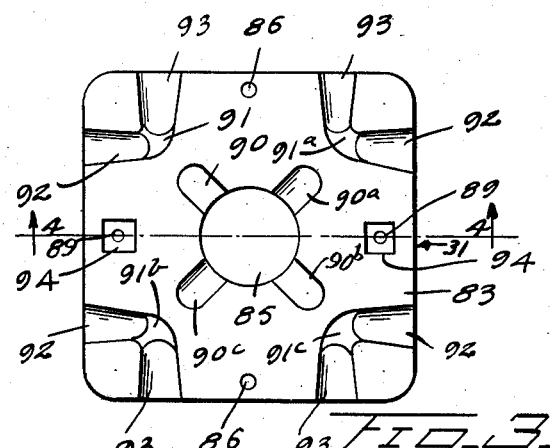
Figure 2:
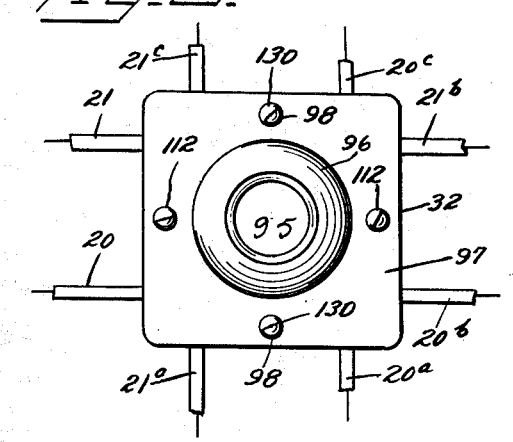

In the drawings, wherein similar reference characters designate similar parts throughout the respective views, Figure 1 is a top plan view of my invention with the top plate of the junction box and top plate or section of the block removed, Figure 2 is a bottom plan view of the insulating block, Figure 3 is a bottom plan view of the top plate or section of the block, Figure 4 is a cross-section taken through the plate on the line 4—4 of Figure 3, Figure 5 is a top plan view of the central or main plate or section of the block, Figure 6 is a top plan view of the main section of the block showing the electrical contacts mounted therein, Figure 7 is a bottom plan view of the main section or plate of the block, Figure 8 is a cross-section taken on line 8—8 of Figure 6, Figure 9 is a section taken on line 9—9 of Figure 6, Figure 10 is a top plan view of the top plate of the block, Figure 11 is a cross-section of a channel shaped electrical contact, and Figure 12 is a section of a special concavo-convex contact.

In the drawings, which are merely illustrative of my invention, all the parts of my invention are disclosed.

The junction or outlet box generally is designated A; the electrical junction or insulating current distributing block is generally denoted at B which forms the basis of my present invention.

The usual four sides or walls of the junction box A are designated 10, 11, 12 and 13, its bottom is denoted 14, its angular corners 15. The top lugs 16 formed upon the angular corners receive in contacting relation thereto the usual cover plate for the box, not shown, in which lugs the screw holes 17 are formed.

From Figure 1 it will be seen that four BX or Greenfield cables 18, 18a, 18b and 18c extend into the four sides of the junction box so that the axially aligned cables 18a and 18c are disposed at right angles to the axially aligned cables 18 and 18b. Inside of the box each of these cables 18, 18a, 18b, and 18c have their covered wires 20, 21; 20a, 21a; 20b, 21b; and 20c, 21c, respectively, extending a short distance from the adjacent side in divergent manner or disposition. The clamping parts of the junction box which hold these cables in place in the box are designated 25.

The main insulating current distributing block B will now be described. It constitutes the essence of my improvement in junction boxes. It consists of three plates or sections united together operatively to produce a unitary body after all contacts with terminals have been inserted properly therein. The top section is designated 31, the main or middle section 30, while the bottom section or plate is designated 32.

The top face of the main section 30 of the block is designated 33 and is illustrated in Figure 5. Here it is seen that this section has a large central cylindrical or circular opening 34 extending therethrough from which extend radiating grooves 35, 36 diagonally of this block section. The groove 36 connects and communicates with a diagonal recess or groove 37 across one corner rounded out and taking right angular turns as at 38, 39, to open out respectively of right angular disposed edges or margins of the block. Holes 40 are also diagonally disposed at this corner of the block, being formed in the groove 37.

A relatively straight contact receiving groove 48 has at one end a head 41 and at its opposite end a toe 50. The head of this groove 48 is located at a corner of the block diagonally opposite to the cross groove 37 while its toe is located on the same margin of the block where groove 37 opens out by means of its turn 38, but this toe 50 is disposed also in or adjacent a corner of the block. The head 41 of the groove 48 is composed of a three-angular terminal receiving recess, one extending to the right and at right angles to groove 48, as at 42, a second recess 43 thereof extending in a direction opposite to branch or offset 42, so as to open out of the adjacent margin of the block which is parallel to groove 48. The third recess of the three angular socket is designated 46, and is disposed substantially in line with groove 48 between recesses 42 and 43 at right angles thereto and it opens out of the margin of the block making a right angle with the last named margin of the block, just referred to. It will also be noted that parallel edges 44, 45 of this head of the groove or passage 48 are disposed diagonally of the corner in which the head is located. It will also be seen that diagonal passage or groove 35 connects with the head of this groove 48.

The toe of the groove or passage 48 is a widened recess 50 which opens out of the edge or margin of the block directly opposite and parallel to that margin out of which offset recess 46 of the head of this groove opens. A hole 51 is formed in this widened toe recess 50 of passage 48.

There is an inclined connecting groove 52 running along that margin of the block into which recess offset 46 opens, and this inclined groove connects with the head of the passage 48, in a plane with inclined edge 45 thereof. The other end of inclined groove 52 connects with a straight short length of groove 53 which opens out at 54 of that margin of the block out of which opens the turn 39 of the cross recess or groove 37. This short straight groove 53 is formed with three aligning holes 55 in the length thereof.

The pair of centrally converging short grooves 35 and 56 register with the central opening 34 of block section 30. The outer end of groove 56 connects with the inner end of groove 53. Arranged diagonally of the block section 30 at the corners thereof so as to respectively flank the short straight groove 53 and the toe of passage 48, are two terminal receiving recesses 57 and 58, being preferably rounded out. The recess 57 has a flaring end opening out of one margin of the section 30, while recess 58 opens out of another margin at right angles to the last mentioned margin. Holes 59 and 60 are formed respectively in recesses 57 and 58. At opposite ends of a medial line of the block section 30 are formed small recesses 61, 62 which are square in cross section. They are located, one midway the length of groove 48, between it and the adjacent parallel margin of the block section, and the other midway between groove 37 and groove 53. Holes 63, 64 are formed in these square recesses 61, 62. In Figures 5 and 9 are shown tubular or sleeve screws 65 and 66 imbedded into the block section 30. They are located at the ends of a medial line of this section which is at right angles to the medial line thereof at the ends of which are located square recesses 61, 62 respectively. The screw holes in these tubular screws 65 and 66 are denoted at 67, 68 respectively. These sleeve screws, as shown in dotted lines in Figure 9 open out from top and bottom sides of block section 30.

In Figure 7, 69 denotes the bottom side or face of the middle section 30 of the block we have just now been considering. It will be noted that all of the block sections have rounded corners 70.

An L-shaped passage or groove has one leg 73 thereof extending along the left of the side margins of the block section and its opposite leg 74 extending along the margin at right angles thereto. Toes 75 and 76 form widened recesses at diagonally opposite corners of this block section 30 into which the hole 59 and the hole 60 respectively open. It will be seen that the corner part of the L-shaped passage is shaped somewhat like the head 41 of the passage 48 shown in Figure 5, except that it has a two angle terminal recess offset 79 instead of a three angle one. One of these offsets of the two angle socket is denoted at 80, and the other, diagonally opposite thereto, is denoted at 80a. The parallel edges 81, 82 of this recess, at the corner of the L-shaped passage, extend diagonally thereof. The holes 40 open into the two angle recess 79.

In Figure 3 the bottom side or face 83 of the top section or plate 31 of the insulating current distributing block is shown. It has a central cylindrical or circular opening 85; holes 86 arranged on opposite ends of a medial line of this block section, and at the ends of another medial line thereof at right angles to the last named medial line, are formed recesses 94 which are square in cross section. The holes 89 in these square recesses 94 extend through to the top side 84 of the block section 31 as shown in Figure 10. On this top side of the block section 31 formed concentrically around the holes 89 are rounded sockets 88.

A cruciform-shaped outline is imparted to the bottom of central opening 85 of the block section 31, by reason of the fact that at the ends of two intersecting diagonal lines thereof radiating spoke-like recesses are formed designated 90, 90a, 90b and 90c. Angular corner sockets are also formed on the bottom side 83 of block section 31, at the corners of which are separating ridges 91, 91a, 91b and 91c respectively, for the four angular corner sockets. These sockets are arranged at the four corners of the block section 31. Each consists of one arm 92, opening out on one of two parallel edges or margins of the block section, while the other arm 93 opens out of the other two margins thereof which are also parallel but in a plane at right angles to the other two parallel margins.

The bottom cover plate or section 32 of the block is shown in Figure 2. The central circular opening therein is denoted at 95. As shown also in Figure 8, this section 32 is formed, in a plane concentrically with opening 95, with an integral annular depending hump 96 of convex cross section, the inner wall of which flares into the interior of opening 95 as well as out of the outer end of the hump as at 96a. The bottom or outer side or face of this block section 32, shown in Figure 2 is designated 97. Round screw-head receiving recesses 98 are formed in this section 32 (Figure 8) along one medial line thereof, and along another medial line thereof at right angles to the one just mentioned and at opposite ends thereof. Holes 98a (Figures 2 and 8) open into the recesses 98.

I will now describe the contact members which are imbedded in the insulator block sections. Referring to Figures 1, 6, 7, 8 and 9, these are clearly shown. 99 designates a contact member shaped to the exact contour of the passage 48 of Figure 5, including its head 41 and toe 50. It lies countersunk in this passage snugly. The head of this contact member is denoted at 101 and the toe at 100. An L-shaped contact member 102 is also shaped to the exact outline of the L-shaped passage or groove shown in Figure 7. This is shown in dotted lines in Figure 1 and Figure 6 necessarily. One contact leg of this contact member 102 is designated (Figure 1) 103, and the other 104. The corner two angle part is designated 105, and the toes at the ends thereof are denoted respectively 106, 106a. It will be seen from the assembly of all sections of the block in Figures 8 and 9, that these contact members 99 and 102 are located respectively on the upper and lower sides of the main block section 30, being countersunk therein. The contact member 102 is snugly countersunk in the correspondingly shaped groove shown in Figure 7. In this disposition of the parts the full and dotted line expositions of these contact members in Figure 6 especially show that toe 106 of the contact member 102 extends at the upper right hand corner of the block section 30, in its bottom face; its corner two angle portion 105 lies at the other corner, being the lower right hand corner thereof, located also on the bottom side thereof. The head 101 of contact member 99 is shown to occupy the third corner, the upper left hand corner of the block 30. The toe 100 of this contact member 99 occupies the fourth, lower left hand corner of block section 30. Also located at the upper right hand corner of the block is a contact plate 102a, which is snugly countersunk in straight recess 53 of the top surface shown in Figure 5. It is shown in Figure 6 to span the leg 103 in groove leg 73 of contact member 102 which is L-shaped, although this contact plate 102a overlies the same side of the current distributing block where contact member 99 is countersunk. At the lower left hand corner of the block the leg 104 in groove leg 74 of the L-shaped contact member 102 intersects and spans the main shank of contact member 99, closely contiguous to its toe 100, although on the other side or face of the block. The toe 106a of this L-shaped contact 102 is thus located also at the lower left hand corner of the block.

There is a contact plate 153 countersunk into diagonal or cross corner recess 37 shown in Figure 5, so that it lies on the same side of the block section 30 where the contact member 99 is located. Finally two contact plates 57a, 58a, shaped to the outline of the rounded recesses 57, 58 shown in Figure 5 are located in countersunk relation in the latter so as also to line on the top side of block section 30 along with contact member 99 and contact plate 153. There has been produced, in effect, two oppositely arranged contact members 99 and 102, located on opposite sides of the block section 30 in such a manner that as viewed in Figure 6, the head 101 of contact member 99 provides a three corner terminal at the upper left hand corner of the block, the portion 105 of contact member 102 provides a two corner terminal for the block located diagonally opposite to the three corner terminal thereof or in the lower right hand corner of the block, contact plate 102a, produces with the adjacent toe 106 of L-shaped contact member 102 a three corner terminal in the upper right hand corner of the block, and toe 100 of contact member 99 in conjunction with the adjacent toe 106a of the L-shaped member 102 provides a two terminal corner in the lower left hand corner of the block.

Binding screws are provided and connect to my invention as follows: In assembling the three sections 30, 31 and 32 of the insulating current distributing block, the central block section 30 is to be attached to the other sections, being top section 31 and lower or bottom section 32.

This is done as follows: I countersink into the square recess 62 of block section 30, Figures 5, 6, and 8, which recess is far deeper than its complemental square recess 94 formed in top section 31, a W or channel-shaped contact member shown in Figure 11. This consists of a stem 107 which overlies one wall of recess 62, and the right annular terminal lugs 108, 109 formed at the ends of stem 107. Holes 110, 111 are formed in the lugs 108, 109, in aligning relation therein. The bottom lug 109 of the channel-shaped contact member abuts the bottom wall of recess 62, and the top lug 108 thereof extends out of block section 30 into block section 31 and enters partially into square recess 94 therein. When sections 31 and 32 are accurately fitted in registering relation with their perimeters coinciding with the perimeters of the central or main block section 30, circular recesses 98 and holes 98a of section 32 will register with screw threaded holes 111 formed in lugs 109 in the two channel-shaped contact members I employ in the completely assembled block.

This permits long headed screw bolts 112 to be inserted into the holes 98a in bottom section 32 so their heads are countersunk (Figures 2 and 8) in circular recesses 98 thereof. The free ends of screw bolts are then passed through holes 63, 64 of central or main section 30, and screwed home tightly into the screw holes 111 in lugs 109 of the two channel-shaped contact members shown in Figure 11. This will clamp sections 30 and 32 together in abutting relation. I then insert screw bolts 118 into holes 89 in the top section or plate 31, Figures 3 and 10, with the convex washers 120 shown in Figure 12 resting or lying in the rectangular recesses 94 therein on top of lugs 108 of the channel-shaped contact members. I then screw home the screw bolts 113 into the screw holes 110 of these lugs 108, so that the heads of these screw bolts abut the edges of the counter-bores 88 in which they are countersunk. As these screw bolts 116, 117 are screwed tightly into the lugs 109, they draw the central block section 30 together in abutting relation also with top section 31, which action results in mashing or flexing the concave-convex washers 120 somewhat to enhance the clamping action.

It will be understood, however, that before clamping the three sections of the blocks 30, 31 and 32 together in the manner just explained, the terminals of the lead-in wires of the cables used in this invention will be first attached to the block insulatedly in the following manner:

As will be seen in Figure 1, six separate wire connections or cables are adapted, at the same time, to be attached to the junction box A and to the block B therein. It is understood that the screws 125 used as terminals may pass through the bottom of the junction box as well as bottom section 32 of the block to unite the block with the junction box.

It has already been shown, as is illustrated fully in Figure 6, that the top side 33 of the main or central block section 30 has countersunk in imbedded relation therein, all the contacts hereinbefore described and designated respectively 99, 102a, 153, 57a and 58a. They are electrically connected in insulated relation to the L-shaped contact member 102 countersunk in the lower face of the block in the following manner.

In Figures 6 and 9 are shown three binding screws 125 which screw into the three screw holes 47 of the block section 30 at head 41 of groove 48 and head 101 of the contact member 99. Binding screws 121 screw into the screw holes formed in contact plate 102a, and also into screw holes 55 of the block section 30. This plate 102a is secured by a screw 127 (Figures 1 and 9) into one of the holes 55 of block section 30. Two binding screws 154, Figure 6, are tapped into screw holes formed in the contact plate 153, and into holes 40 of the block 30. Two binding screws 155 are screwed home into the screw holes in the contact plates 57a, 58a, being also tapped into screw holes 59, 60 of block section 30. There is also a binding screw 156 which is tapped into the toe 100 of contact member 99 and enters hole 51 of block section 30. This makes 10 binding screws in all.

In Figure 1 is seen how the four BX cables 18, 18a, 18b and 18c are connected to the insulating block, together with two other wire connections. Thus generally described, the two positive and negative wires 20 and 21, respectively, of cable 18 are bound under screws 125 and 155, respectively, of contacts 99 and 58a onto the top face 33 of main block section 30, on the left side of the junction box A. Wires 21a and 20a of cable 18a are bound under screws 125, 155 respectively of contact member 99 and contact plate 57a, on the top side of the box shown in Figure 1. Wires 20b and 21b of cable 18b are bound under screws 121 of contact plate 102a and 154 of contact plate 153, respectively. Wires 21c and 20c of cable 18c are bound under screws respectively 156 of the toe 100 of contact member 99, and 154 of contact plate 153, on the lower side of the box A. All of these wires are thus mounted in open wire work, in untwisted relation, upon the same surface or top side 33 of the main block section 30, being bound under the binding screws. In addition, two other sets of wires 134, 135 and 157, 158 (Figures 1 and 8) are wired in the same fashion, to the block as follows. The wires 135, 134 are bound under screws 125 of contact member 99, and 121 of contact plate 102a, respectively, and bound by the same screws may be the wires 157, 158. The wires 134, 135, 157 and 158 enter the central openings 95, 34 and 85 of the three assembled block sections shown in Figure 8 and therefrom extend in opposing directions from the center of the block as distinguished from the sides of the block and box from where cables 18, 18a, 18b and 18c extend.

Figure 8 indicates how the covered wires 134, 135 and 157, 158 may enter the completed holes formed complementally in sections 30 and 31 of the assembled block sections formed by recesses 35, 90 and 56 and 90a.

The three sections 30, 31 and 32 are further clamped together, after all wire connections have been made to all cables, as hereinbefore set forth as follows. Screw bolts 121 already adverted to, have their shanks, Figure 9, and screw bolts 125, already adverted to, have their shanks tapped into screw sockets formed in the block section 32. This helps to clamp block sections 30 and 32 together. Further, elongated screw bolts 130, two in number, Figure 9, screw home into the tubular screw holes 67, 68 of the tubular screws 65 and 66 of the section 30 of the block passing through holes 85, 86 of the top block section 31, so the heads (Figure 1) of these screw bolts are countersunk in these latter holes. This effectively assists in clamping all three block sections together.

It will be particularly noted, in Figure 1, that the portion 105, shown in dotted lines in this figure, of contact member 102, has screw holes registering exactly with the screw holes in contact plate 153 into which the binding screws 154 have been tapped, so that these screws 154 connect electrically member 102 and contact plate 153. It will also be seen that when all block sections are fully assembled as shown in Figures 8 and 9 particularly, the complemental grooves or passages of block sections 30 and 31 form complete outlines of channels. In such channels lie the heads of all binding screws which are covered over by the insulating top block section 31. The wires of the cables 18, 18a, 18b and 18c come out laterally through the recesses 92, 93 shown in Figure 3 so as to project at right angles to the side faces of the central section 30.

Having thus described an embodiment of a junction box assembly according to this invention, it is to be understood that I do not mean to confine myself to the exact details of construction herein disclosed save as pointed out in the appended claims.

What I desire to claim is:

1. In a device of the kind described, a four sided current distributing insulating block, having embedded therein in one face an L-shaped electrically conducting member with binding screws at the ends thereof at two diagonally opposite corners of the block, and a two binding screw terminal at the junction of the legs thereof, a rectilinear electrically conducting member embedded in the other face of said block and disposed parallel to one leg of the L-shaped member at opposite margins of said block, and having a one binding screw terminal at one end crossing the other leg of the L-shaped member and a three binding screw terminal at the other end of said rectilinear member, and a two binding screw terminal imbedded in the same face of the block as the rectilinear member and arranged in marginal alignment with the end of the L-shaped contact diagonally opposite to said crossing terminal of the rectilinear contact.

2. As a new article of manufacture, a square insulating block formed with a central through opening, an L-shaped electrically conducting member embedded in one face of said block with the legs thereof extending parallel to the side edges of said block, a pair of terminals connected to said member at the heel thereof, a terminal connected to the end of each of the legs of said L-shaped member, an elongated straight electrically conducting member embedded in the other face of said block extending substantially parallel to one of the legs of said first mentioned member and adjacent to the edge of the block removed from the edge adjacent to said one leg, said straight member having an end intersecting the plane of the other leg of said L-shaped member, a single terminal carried by said intersecting end of said straight member, three terminals carried by the opposite end of said straight member, a short straight electrically conducting member embedded in said other face of said block and spanning said one leg of said L-shaped member adjacent the end of the latter, a pair of terminals carried by said last mentioned member, and outwardly opening grooves formed in said other face of said block communicating with each of said terminals.

3. An insulator block comprising three rectangular superposed sections, said sections formed with registered central openings, the middle one of said sections having an elongated terminal plate embedded in one face thereof adjacent a marginal edge, terminals carried by the opposite ends of said plate, an L-shaped electrically conducting member embedded in the other face of said middle section and disposed with one leg thereof extending parallel to said terminal plate and adjacent to the edge of said middle section opposite to said first mentioned marginal edge, terminals connected to ends of the legs of said L-shaped member and extending through said section to said one face of the latter, a diagonal terminal plate embedded in said one face and overlying the heel of said L-shaped member, terminals carried by said diagonal plate and electrically connected to said L-shaped member, a short rectilinear terminal plate embedded in said one face and spanning said one leg of said L-shaped member adjacent the end of the latter, a pair of terminals carried by said last mentioned terminal plate, and grooves formed in said one face of said middle section communicating each of said terminals with the adjacent marginal edge of said middle section.

FRANCOIS A. LASSERRE.

REFERENCES CITED

The following references are of record in the file of this patent:

UNITED STATES PATENTS

| Number | Name | Date |
|---|---|---|
| 1,586,709 | Schwinger | June 1, 1926 |
| 1,915,199 | Park | June 20, 1933 |
| 2,288,139 | Moore | June 30, 1942 |
| 2,306,596 | Despard | Dec. 29, 1942 |

FOREIGN PATENTS

| Number | Country | Date |
|---|---|---|
| 11,676 | England | of 1906 |
| 383,683 | Germany | Oct. 16, 1923 |
| 323,799 | England | Jan. 10, 1930 |